R. BEAN.

PUMP.

No. 9,866. Reissued Sept., 13, 1881.

Witnesses,
Franck L. Durand
H. Aubrey Toulmin

Inventor
Roscoe Bean
By C. M. Alexander
Attorney

UNITED STATES PATENT OFFICE.

ROSCOE BEAN, OF SPRINGFIELD, OHIO.

PUMP

SPECIFICATION forming part of Reissued Letters Patent No. 9,866, dated September 13, 1881

Original No. 201,734, dated March 26, 1878. Application for reissue filed May 4, 1881.

201734

*To all whom it may concern:*

Be it known that I, ROSCOE BEAN, of Springfield, in the county of Clarke and State of Ohio, have invented certain new and useful Improvements in Pumps; and I do hereby declare that the following is a full, clear, and exact description thereof, reference being had to the accompanying drawings, and to the letters of reference marked thereon, which form a part of this specification.

This invention relates to certain improvements in pumps; and it consists in the construction and arrangement of a pump and its several parts, the peculiarities of which will be hereinafter more fully set forth.

To enable those skilled in the art to make and use my invention, I will proceed to describe its construction and operation.

Figure 1:
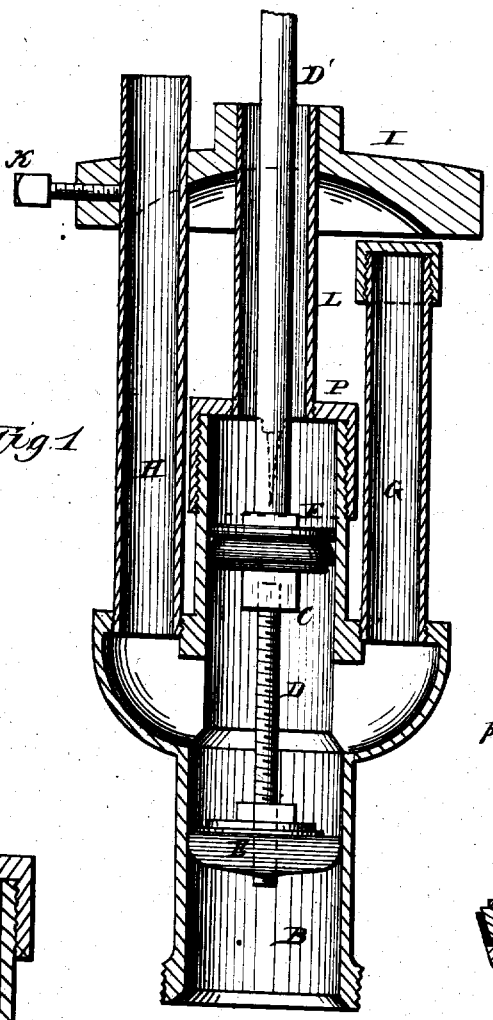
Figure 2:
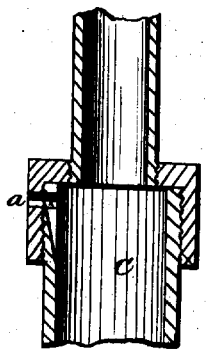
Figure 3:
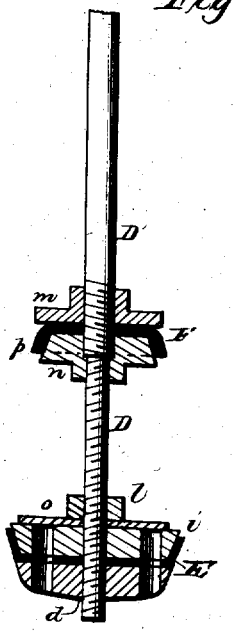

In the accompanying drawings, making part of this specification, Figure 1 represents a longitudinal section; Fig. 2, a detached part in section, and Fig. 3 a section of the buckets with pump-rod attached.

The letter A indicates the body of the pump, which has formed in it two cylinders of unequal diameters.

B indicates the lower and larger cylinder, while C is the smaller or upper one.

E and F are the two buckets which play in these cylinders, and which are connected to the rods D and D′. The upper bucket, F, is constructed in two parts. The face-nuts *m* and *n* constitute the two parts, and the packing *p* is placed and clamped between them.

It will be observed that the lower bucket, E, is screwed on the lower end of the rod D, and the part *n* of the upper bucket has secured into it the upper end of the same rod D. The leather cup or washer *p* is then placed over said part *n*.

It will be noticed that the rod D is somewhat smaller than the rod D′ in diameter.

The part *m* of the upper bucket is screwed on the lower end of the rod D′, up to a suitable point thereon. By now uniting the two parts *m n* by screwing the end of the rod D′ into the part *m*, the leather cup or washer becomes clamped between the two parts *m* and *n*, and a firm and rigid connection is made. As the packing wears it can be expanded by simply turning one of the rods so as to bring the two parts *m* and *n* closer together, it being understood that a threaded recess is made from the top in the part *n* of the upper bucket to allow the lower end of the rod D′ to enter. When the packing is worn out and has to be renewed, the rod D is unscrewed from the part *n*, and said rod D, with the lower plunger, E, and the lower part, *n*, of the upper plunger removed together through the lower end of the cylinder, the air-chamber G being unscrewed and the entire pump being raised for the purpose, the old leather taken off, a new one put on, and the parts reunited again, all without removing the cap of the cylinder or in any way disturbing any joint or connection in the pump.

The lower bucket, E, is composed of a packing clamped between two plates, *i* and *d*, which screw up and down upon the rod D. The leather *o* is held in place by jam-nut *l*.

The pump-body is provided upon one side with an air pipe or chamber, G, and upon the other with a water-discharge pipe, H. Both of these connect with the body at a point between the lower and upper cylinders, as represented.

The letter I indicates the pump curbing or platform, which is connected to the cylinder by means of a tube or hollow rod, L, said tube being firmly connected to each for the purpose of steadying and supporting the pump. The pump-rod passes down through this tube L. The water-discharge pipe H also passes into and through the curb or platform. This pipe is secured to the curb or platform by means of a set-screw, K, and thus unites with the tube L in keeping the pump steady below.

In the side of the upper cylinder, near its upper end, is an aperture, *a*, for the escape of any water which may collect above the bucket, which would become contaminated by rust and give a bad taste to the water, and would gradually work up into the tube L and overflow, and in cold weather would freeze, causing much damage. In the side of the cylinder, just by the aperture *a*, is a vertical groove, which allows the water upon the bucket and below the hole to escape around the bucket and pass to the cylinder below.

The letter P indicates a cap for the upper cylinder, forming its head and screwing over it. The tube L screws into this cap or head.

Having thus fully described my invention, what I claim, and desire to secure by Letters Patent, is—

1. A pump consisting of two unequal cylinders and their buckets and pump-rod, the upper cylinder being connected to the curb or platform by a tube or hollow rod, substantially as and for the purpose specified.

2. A pump consisting of two unequal cylinders, their buckets and pump-rod, the unequal buckets and pump-rod, the hollow connecting-rod connecting the pump with the curb or platform, the air-chamber, and discharge-pipe, all arranged substantially as specified.

3. In a pump, a divided piston-rod of unequal diameter, the upper portion carrying binding face-nuts with an interposed packing, and the lower portion thereof being adapted to be secured to the lower face-nut, substantially as shown.

4. The tube L, connected to the curbing I, and screwed into the cap P at its lower end, said cap being screwed to the top of the cylinder C, and said cylinder being connected by screw-threads to the lower ends of the pipes H G, the said parts being combined substantially as and for the purposes herein set forth.

5. In a pump, a divided plunger-rod, D′ D, each having one part of a divided plunger, F, secured on it, with packing *p* inserted between the two and the parts screwed together, substantially as and for the purposes herein set forth.

6. The combination of the divided plunger-rod D D′, the plunger E on the lower end of the rod D, the upper plunger, F, made in two parts, *m n*, secured, respectively, on adjacent ends of the two rods, and the packing *p*, clamped between the two parts *m n* by uniting the two parts of the rod, as described.

In testimony that I claim the foregoing I have hereunto set my hand this 19th day of April, 1881.

ROSCOE BEAN.

Witnesses:
WM. R. HOMER,
B. F. WEIGEL.